April 18, 1944.      N. H. CURTISS ET AL      2,347,086
TUBE CORRUGATING MACHINE
Filed May 6, 1942      5 Sheets-Sheet 2

INVENTORS
NATHANIEL H. CURTISS
THOR J. AAMLAND
BY Lester F. Buckley
ATTORNEY

April 18, 1944.   N. H. CURTISS ET AL   2,347,086
TUBE CORRUGATING MACHINE
Filed May 6, 1942          5 Sheets-Sheet 3
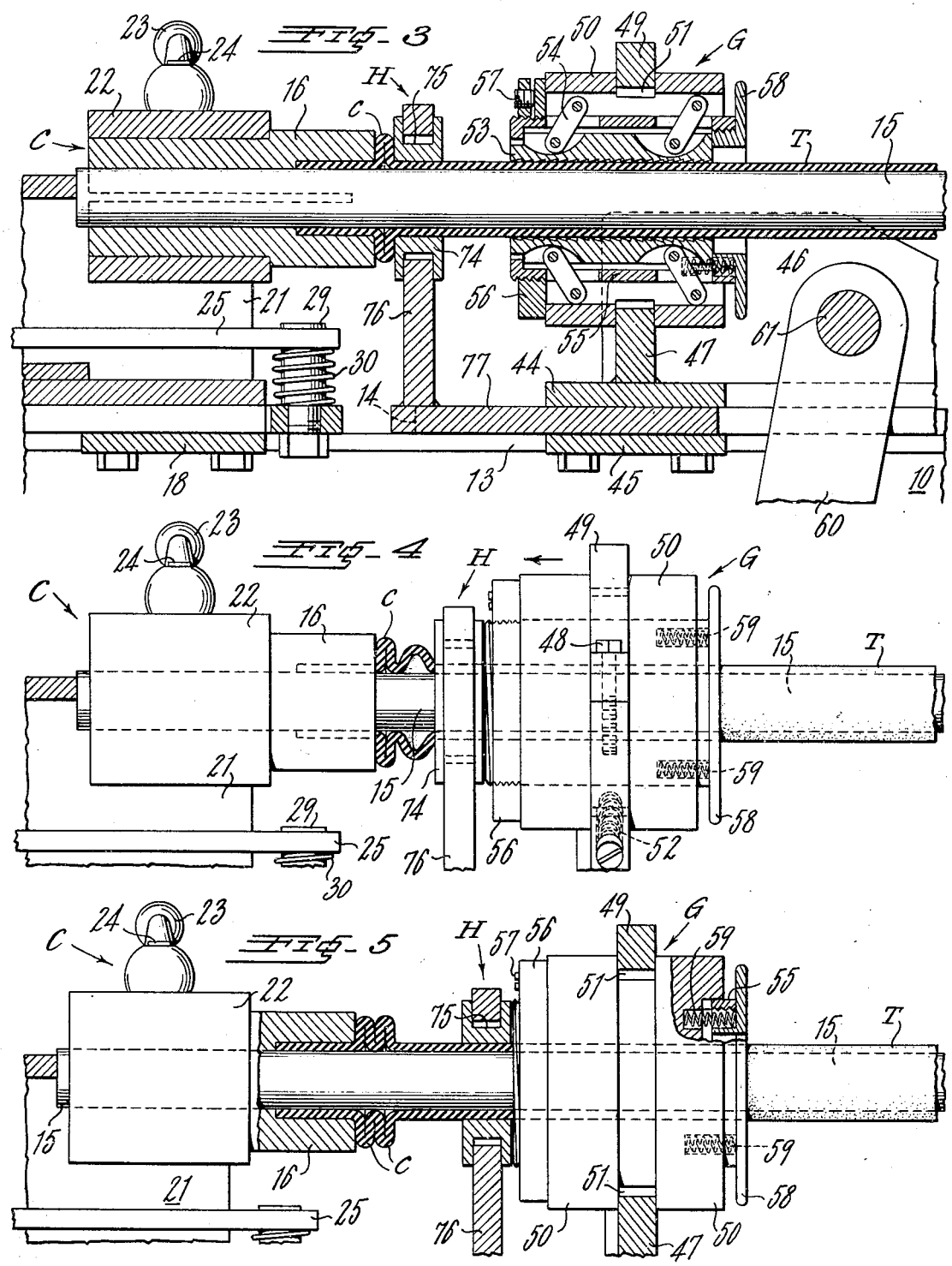
INVENTORS
NATHANIEL H. CURTISS
THOR J. AAMLAND
BY
Lester L. Budlong
ATTORNEY

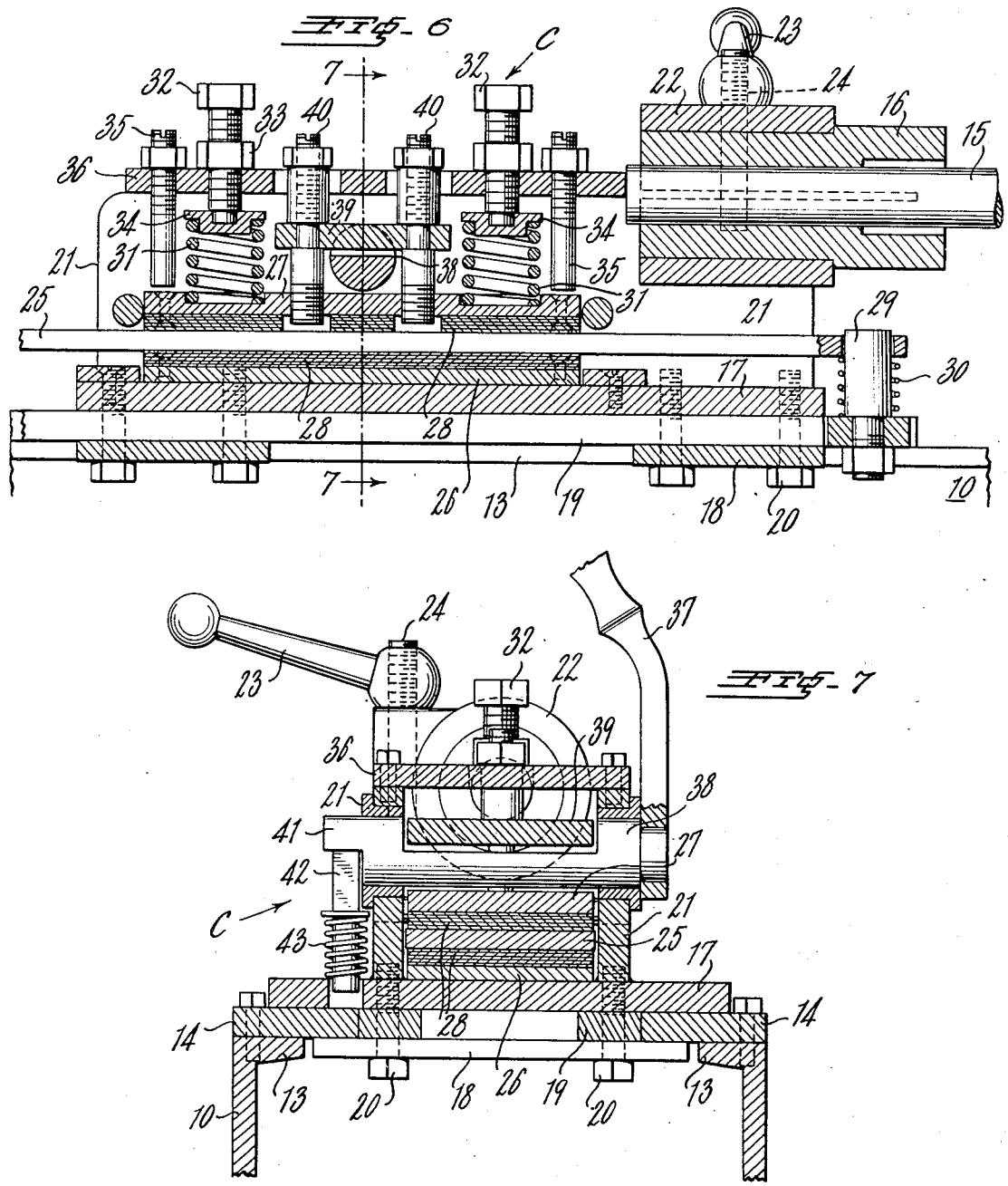

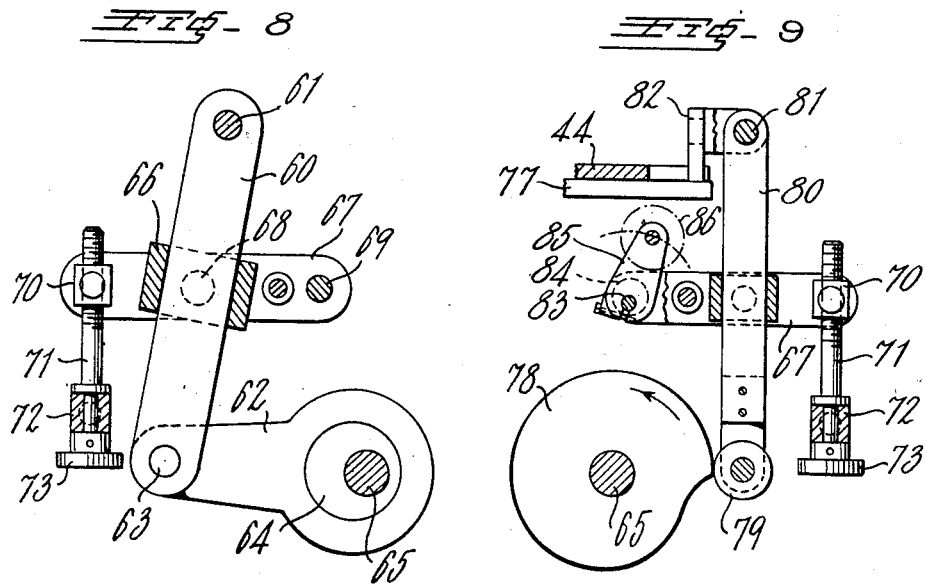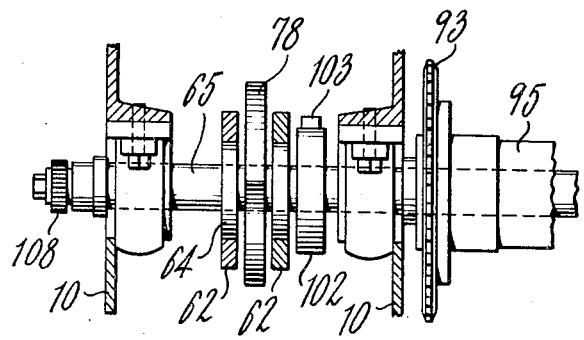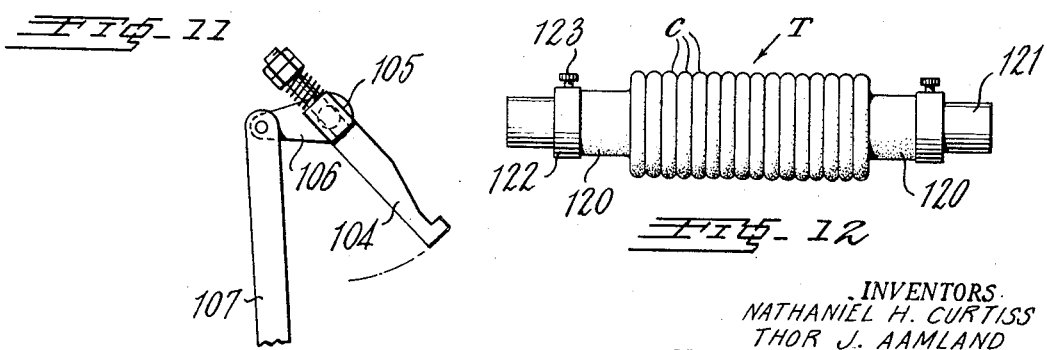

Patented Apr. 18, 1944

2,347,086

UNITED STATES PATENT OFFICE 2,347,086

TUBE CORRUGATING MACHINE

Nathaniel H. Curtiss, Clifton, and Thor J. Aamland, Leonia, N. J., assignors to United States Rubber Company, New York, N. Y., a corporation of New Jersey Application May 6, 1942, Serial No. 442,000

15 Claims. (Cl. 18—19)

This invention relates to machines for corrugating tubes formed of different expansible materials, but has been developed more particularly for corrugating rubber tubes used upon gas masks.

Heretofore rubber tubes have been corrugated by a molding operation, and by shaping them on corrugated mandrels adapted to be collapsed by extending the mandrel longitudinally; and ductile metal tubes have been corrugated heretofore by subjecting them to an hydraulic internal pressure while they are confined externally by shaping means.

In each of these prior methods a predetermined number of corrugations are formed simultaneously, and if a tube having a different number of corrugations is required it can not be readily produced without first changing the corrugation forming mechanism.

The present invention contemplates a machine that is adapted to form annular corrugations successively along a tube by compressing the tube longitudinally until it bulges laterally to form the desired corrugation. This is accomplished by the present machine without subjecting the tube to internal hydraulic pressure and without requiring a corrugated mold or a corrugated mandrel to shape the tube, and since the corrugations are formed one at a time along the tube the number of corrugations produced can be readily varied as desired.

In the Watson G. Harding U. S. application Serial No. 394,278 filed May 20, 1941, there is disclosed and claimed a simple method of forming annular corrugations successively along a tube. The present machine has been developed to provide power operated mechanism for corrugating tubes substantially in accordance with the method of said application.

Important features of the present machine reside in means for supporting a mandrel having a tube thereupon to be corrugated, and having associated therewith power operated mechanism adapted to grip the tube and compress it longitudinally to produce the desired corrugation, and in other mechanism operated in synchronized relation with the corrugating mechanism adapted to engage the corrugation last formed and hold it from spreading lengthwise of the tube.

A further feature of the present invention resides in the construction whereby the mandrel supporting means is mounted to slide away from the corrugation forming position as the corrugations accumulate along the tube, to thereby control the amount of pressure which will be exerted longitudinally of the tube in forming the corrugations.

The above and other features of the invention and novel combination of parts will be more fully understood from the following description when read in connection with the accompanying drawings, wherein:

Fig. 3 is a longitudinal sectional view through the corrugation-forming mechanism of Fig. 1, the corrugation holder being shown as abutting against a corrugation;

Fig. 4 is a similar view with parts in full lines, the corrugation holder being shown in an intermediate position;

Fig. 5 is a similar view, the corrugation holder being shown as fully retracted;

Fig. 6 is a longitudinal sectional view through sliding mechanism to be described and which supports the tube and mandrel;

Fig. 7 is a sectional view taken on the line 7—7 of Fig. 6;

Fig. 8 is a side view with parts in section of eccentric operated means to be described;

Fig. 9 is a side view with parts in section of cam operated means to be described;

Fig. 10 is a side view with parts in section of the main power shaft and associated parts;

Fig. 11 is a detailed view of latch means to be described; and

Fig. 12 is a side view of a tube which has been corrugated.

Figure 1:
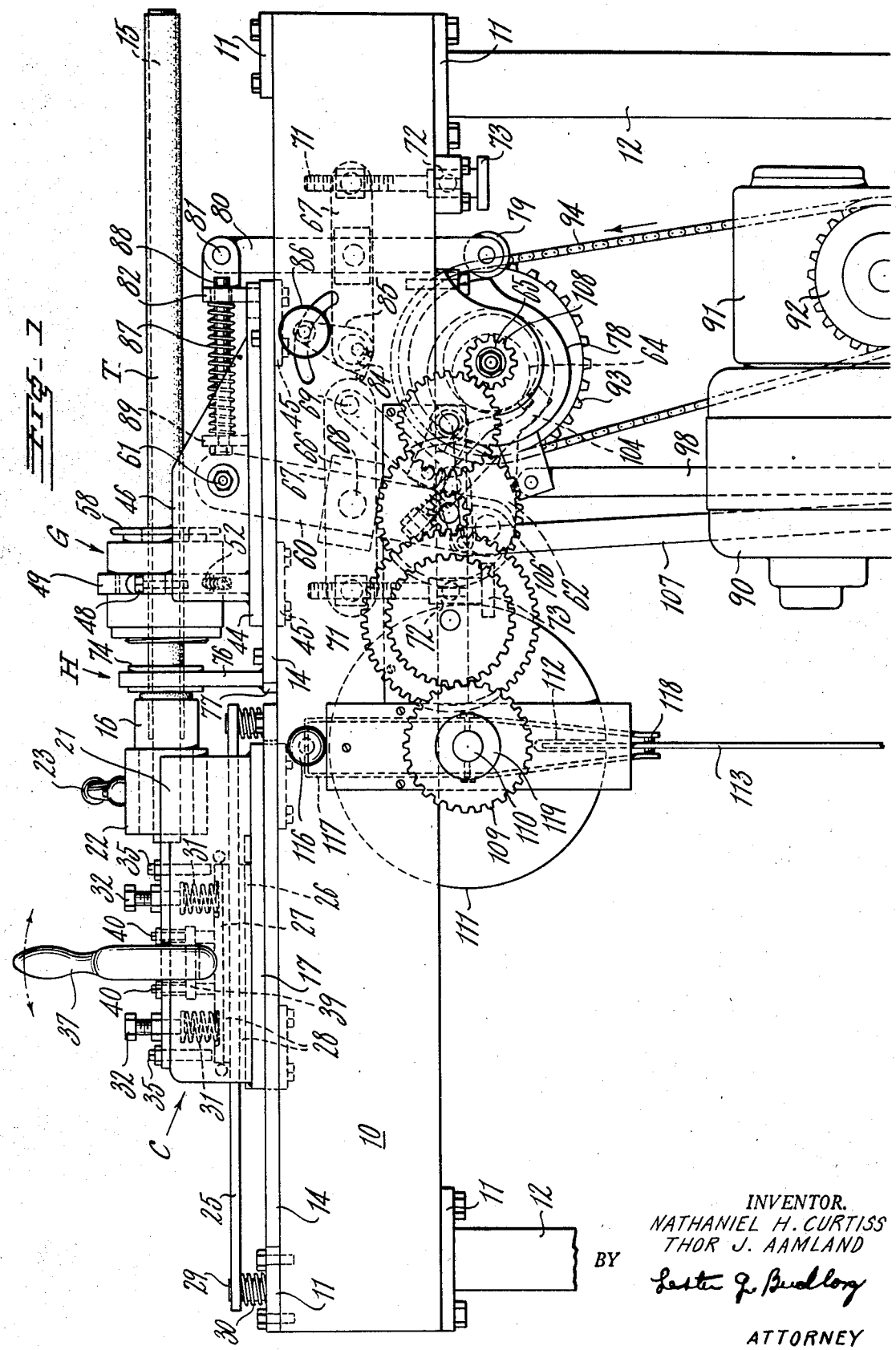
Fig. 1 is a front elevation of a tube corrugating machine constructed in accordance with the present invention.

The machine of the present invention may be employed, as above stated, to corrugate tubes of various materials which may be expanded laterally to a substantial degree, but the invention will be herein described in reference to a tube made of rubber. These rubber tubes are extensively used for gas masks to form a non-collapsible tube extending from the mask to a casing containing the gas purifying material. These tubes are commonly made from a tube of extruded unvulcanized rubber about which a protecting cover of knitted fabric that has been treated with rubber is wrapped. The fabric is preferably a plain knitted goods which is so placed about the tube that the maximum stretch of the fabric is in the direction in which the tube is expanded in forming the corrugations. The tube T shown in the drawings is or may be constructed in this manner and is corrugated before the rubber is vulcanized. After the tube has had the desired number of corrugations imparted thereto it is vulcanized, whereupon it is ready for use in gas masks.

In the embodiment of the invention shown in the drawings, the operating parts of the machine are supported at a desired distance from the floor by a main frame consisting of the side rails 10 which are secured in spaced relation to each other by the transverse plates 11 that are bolted to the side rails near their opposite ends, and the frame thus formed is supported at the desired distance from the floor by the uprights 12.

Each side rail 10 is provided at its upper edge with an inwardly extending flange 13 and upon these flanges are secured at the left-hand portion of the main frame, as shown in Fig. 1, the plates or rails 14 that form a slideway for the mandrel supporting carriage to be described.

The rubber tube T has inserted therein the supporting mandrel 15 and during the formation of the corrugations this mandrel and the tube T are supported by the mandrel gripping sleeve 16 which is provided at the forward end of the sliding carriage C. As shown in Figs. 6 and 7, the carriage has a base plate 17 which rests upon the rails 14. The carriage is slidably secured to these rails by the transversely extending plates 18 and the longitudinally extending spacer bars 19. The plates 18 and bars 19 are rigidly secured to the base plate 17 by the bolts 20. The base plate 17 has extending upwardly therefrom the spaced side plates 21 and near the forward ends of these plates is provided a split clamping ring 22 in which is mounted the split mandrel gripping sleeve 16. This sleeve and ring are contracted about the mandrel 15 by operating the clamping lever 23 one end of which has threaded engagement with the upper end of the bolt 24 that is disposed adjacent the split side of the sleeve 16 and ring 22 as will be apparent from Fig. 7. The arrangement is such that when this lever is turned upon the threaded bolt 24 it will exert a downward pressure upon the split portion of this sleeve and ring to thereby firmly grip the mandrel 15 and hold it so that it extends lengthwise of the main frame as shown in Fig. 1.

The sliding carriage C, in accordance with the present invention, is mounted to recede yieldingly lengthwise of the main frame under the resistance of friction means as the corrugations are successively formed, and to this end there is provided the friction rail 25 that extends lengthwise of the main frame throughout a substantial portion of its length and which passes through the carriage C between the side plates 21. The arrangement is such that this rail 25 is frictionally gripped between a lower plate 26 and upper plate 27 each of which has secured to the active face thereof a leather friction pad 28; these pads frictionally engage the opposite faces of the rail 25. The plate 26 is rigidly secured to the base plate 17, and the upper plate 27 is movably mounted within the carriage so that it may be moved toward and from the rail 25 to vary the frictional engagement of the pads 28 with this rail. The rail 25 is floatingly secured to the main frame so that it is prevented from moving lengthwise of the machine but has a slight movement in a vertical direction. To this end the rail 25 has a hole formed therein adjacent each end through which a pin 29 that is rigidly secured to the main frame extends. About each of these pins 29 is provided a coiled spring 30 adapted to yieldingly support the weight of the rail 25.

The friction-applying upper plate 27 is continuously urged into gripping relation with the rail 25 by the coiled springs 31 confined within the cartridge C as best shown in Fig. 6, and the pressure which these springs exert downwardly on the plate 27 may be varied as desired by adjusting the bolts 32 having the clamping nuts 33, and the spring engaging discs 34 at their lower ends. The upward movement of the plate 27 is limited by the adjustable stop bolts 35. The bolts 32 and 35 are threaded within the top plate 36 which is rigidly secured to the side plates 21 of the carriage.

It is desired to provide manually controlled means whereby the frictional engagement of the leather pads 28 with the rail 25 may be relieved when the operator desires to move the carriage lengthwise of its runway. The means shown for relieving this frictional engagement comprises the upstanding lever 37 which is adapted to be rocked either to the right or left as indicated by the arrows in Fig. 1. The arrangement is such that when this lever 37 is in the position in which it is shown in Fig. 1 the rail 25 will be frictionally engaged, but this friction may be relieved by rocking the lever 37 in either direction. The lever 37 is secured to a rocking shaft 38 that is journaled in bearings in the side plates 21 and the upper face of this shaft is cut away between the side plates 21 to provide a clearance space over which the plate 39 extends. This plate is rigidly connected to the friction plate 27 in spaced relation thereto by the adjustable bolts 40. The arrangement is such that when the shaft 38 is rocked by its lever 37 the flattened portion of this shaft will act upon the plate 39 to force it upwardly and thereby lift the upper friction plate 27 to relieve the frictional pressure of the plates 26 and 27 upon the rail 25. The hand lever 37 is normally held in the upright position in which it is shown in Fig. 1 by providing the rear end of the shaft 38 with the shoulder 41 against which the upper end of the plunger 42 presses as this plunger is continuously urged upwardly by its coiled spring 43.

Having described the construction and operation of the sliding carriage C, the tube gripping means which is provided to grip the tube T and compress it longitudinally to cause it to bulge outwardly so as to form a corrugation will now be described.

Referring to Figs. 1, and 3 to 5, the tube gripping means is designated in its entirety by the letter G and comprises a carriage that is mounted for limited sliding movement lengthwise of the main frame. This carriage has a base plate 44 which is of sufficient width to rest upon the side rails 14, and is slidably secured to these rails by the transversely extending plates 45 which are spaced from the plate 44 by spacer bars that are similar in construction and arrangement to the spacer bars 19 above described. The base plate 44 has extending upwardly therefrom the side plates 46 and between these side plates is provided the transversely extending plate 47. This plate 47 is constructed to floatingly support the tube clutching mechanism to be described, and to this end the upper portion of the plate 47 is cut away in the form of a semi-circle and has secured to the upper face thereof by the bolts 48 a yoke 49 which is similarly cut away. The annular opening thus formed between the plates 47 and 49 is adapted to receive the cylindrical casing 50 of the clutch member and which casing is provided with the annular groove 51 whereby this casing is floatingly mounted within the annular opening just mentioned. The weight of this casing is yieldingly supported by the inclined coiled springs 52 mounted within openings formed in the plate 47. The object in floatingly mounting the casing 50 is to permit the same sufficient movement to center itself about the mandrel 15 and tube T when it is in clutching engagement with the tube.

The clutch mechanism within the cylindrical casing 50 is so constructed that the clutching elements will slide along the tube T when they are moved in a right-hand direction viewing Fig. 3 but will automatically grip this tube when moved to the left to thereby compress this tube longitudinally to corrugate the same. To this end there is mounted in the cylindrical casing 50 four clamping jaws 53 which are movably connected to the casing 50 by the links 54 that operate in slots formed in the casing 50. The movement of the jaws 53 longitudinally within the cylindrical casing 50 is limited by the sleeve 55 which is threaded at both ends and has secured to one end the large nut or threaded disc 56 which is locked in place upon the sleeve 55 by the set screw 57. The sleeve 55 has threadedly secured to its opposite end the large disc 58. The movement of the sleeve 55 lengthwise within the cylindrical casing 50 is limited in one direction by the disc 56 and in the opposite direction by the disc 58. The clutching members 53 are continuously urged towards gripping engagement with the tube T by the compressed springs 59 confined in sockets formed in the casing 50 and disc 58.

The construction of the tube gripper G is such that it will move along the tube T away from the mandrel supporting carriage C but will grip the tube and compress it to corrugate the tube when this gripper is moved towards the carriage C.

The present machine is provided with means for positively reciprocating the tube gripper G and its supporting carriage and to this end there is provided the rocking lever 60 the upper end of which is pivotally secured to the side walls 46 of the carriage by the transversely extending pin 61. The lever 60 is provided intermediate its ends with an adjustable trunnion by means of which it is rockingly connected to the main supporting frame of the machine. This adjustable mechanism is best shown in Fig. 8. Rocking movement is imparted to the lever 60 by the eccentric straps 62 which are disposed at the opposite sides of the lever 60 and are pivotally secured thereto by the pin 63. These eccentric straps embrace the eccentrics 64 rigidly secured to the power shaft 65 which shaft is best shown in Fig. 10. The arrangement is such that rotation of the shaft 65 will operate these eccentric straps to move the tube gripper G back and forth along a definite path the length of which may be increased or decreased as desired by adjusting the position of the trunnion mechanism that consists of the sleeve 66 which slidably embraces the lever 60. This sleeve is mounted between the spaced links 67 and is pivotally secured thereto at 68, and these links are pivotally secured to the main frame by the shaft 69. The opposite ends of these links 67 have pivotally mounted therebetween the threaded block 70 which threadedly receives the bolt 71 that is rotatably mounted in the supporting block 72 which is pivotally attached to the main frame. This threaded bolt is provided at its lower end with the hand adjusting wheel 73. The arrangement is such that the rotation of this wheel will serve to move the trunnion block 66 along the lever 60 to thereby increase or decrease the stroke of the tube gripper G.

When a corrugation has been formed in the rubber tube T by the mechanism just described it is necessary to provide means for holding the corrugation from spreading longitudinally of the mandrel 15 as the mechanism G is retracted, and to this end there is provided the corrugation holder H, which in the construction shown comprises the tube surrounding ring 74 which is provided with the annular groove 75 that serves to floatingly mount this ring in the annular opening formed in the upstanding plate 76 which plate is rigidly secured to the sliding base plate 77. This base plate 77 is slidably secured to the base plate 44 above described so that one may slide relatively to the other and the tube gripper G and corrugation holder H can be independently moved.

The means shown in Figs. 9 and 10 for moving the corrugation holder H towards the carriage C is the cam 78 rigidly secured to the power shaft 65. This cam engages a roller 79 secured to the lower end of the rocking lever 80 the upper end of which lever is pivoted at 81 to a bracket 82 provided at one end of the sliding base plate 77. Mechanism is provided for varying the length of stroke imparted to the carriage. This mechanism is best shown in Fig. 9 and is similar to the trunnion adjusting mechanism shown in Fig. 8 except that in Fig. 9 additional means is provided for adjusting the trunnion supporting links in the direction of their length. To this end the links 67 shown in Fig. 9 are provided at their left hand ends with the transversely extending shaft 83 which is journaled in or supported by the main frame and is provided with the eccentric 84. To this shaft 83 is rigidly secured the adjusting crank arm 85 that is provided at its upper end with the adjusting knob 86. The arrangement is such that when this adjusting knob is moved along the curved slot formed in the side rail 10 (see Fig. 1) it will rotate the eccentric 84 to advance the links 67 bodily in the direction of their length to thereby change the location of the stroke imparted to the corrugation holder H.

The operating lever 80 serves to hold the corrugation holder H against the last formed corrugation and this holder is moved in the opposite direction by the compressed springs 87 mounted on the bolts 88. These bolts are rigidly secured to an upstanding plate 89 upon the base plate 44, and the opposite ends of these bolts slide in openings formed in the bracket 82. The arrangement is such that these compressed springs are confined between the upstanding plate 89 provided upon the base plate 44 and the upstanding plate 82 provided upon the base plate 77 and serve to hold the roller 79 at the lower end of the lever 80 against the cam 78.

In the construction shown all parts of the machine are operated from the main power shaft 65 which is driven by the electric motor 90 mounted beneath the main frame and has associated therewith the speed reducing gear box 91 which serves to drive the sprocket wheel 92 that in turn drives the sprocket wheel 93 by means of the sprocket chain 94. The sprocket wheel 93 is connected by a specially constructed clutch to the main power shaft 65 whereby this shaft will always come to rest in the same position of angular rotation. Such clutch mechanism is well known and need not be herein described in detail. It will suffice to say that the sprocket 93 is rigidly secured to the tubular sleeve 95 which has the main power shaft 65 rotatably mounted therein. This sleeve 95 is provided at its rear end with clutch mechanism 96 the operation of which is controlled by the rocking arm 97. The outer end of this arm is connected by the rod 98 to the rear end of the foot control lever 99. One portion of the clutch 96 is held against rotation by the projecting arm 100 the outer end of which is fastened to the fixed rod 101 that extends rearwardly from the main frame.

In order to insure that the shaft 65 will always come to rest in the same position of angular rotation there is rigidly mounted upon this shaft the ring 102 upon which there is provided the projection 103 that is adapted to be engaged by a pivoted latch 104. This latch is pivotally and yieldingly supported by the machine frame at 105 and its movement towards and from a position to engage the stop 103 is controlled by the laterally extending arm 106 the outer end of which is connected to the foot treadle 99 by the rod 107. The arrangement is such that when the foot treadle 99 occupies the non-running position in which it is shown in full lines in Fig. 2 the clutch mechanism 96 will be released and the latch 104 will occupy a position to engage the stop 103 and thereby bring the shaft 65 to rest in a predetermined position of angular rotation. The parts of the machine are shown in Fig. 1 in the positions which they occupy when they come to rest. In the position of rest the holder H is held against the last formed corrugation, and the gripping head G has been retracted and is spaced from the holder.

Figure 2:
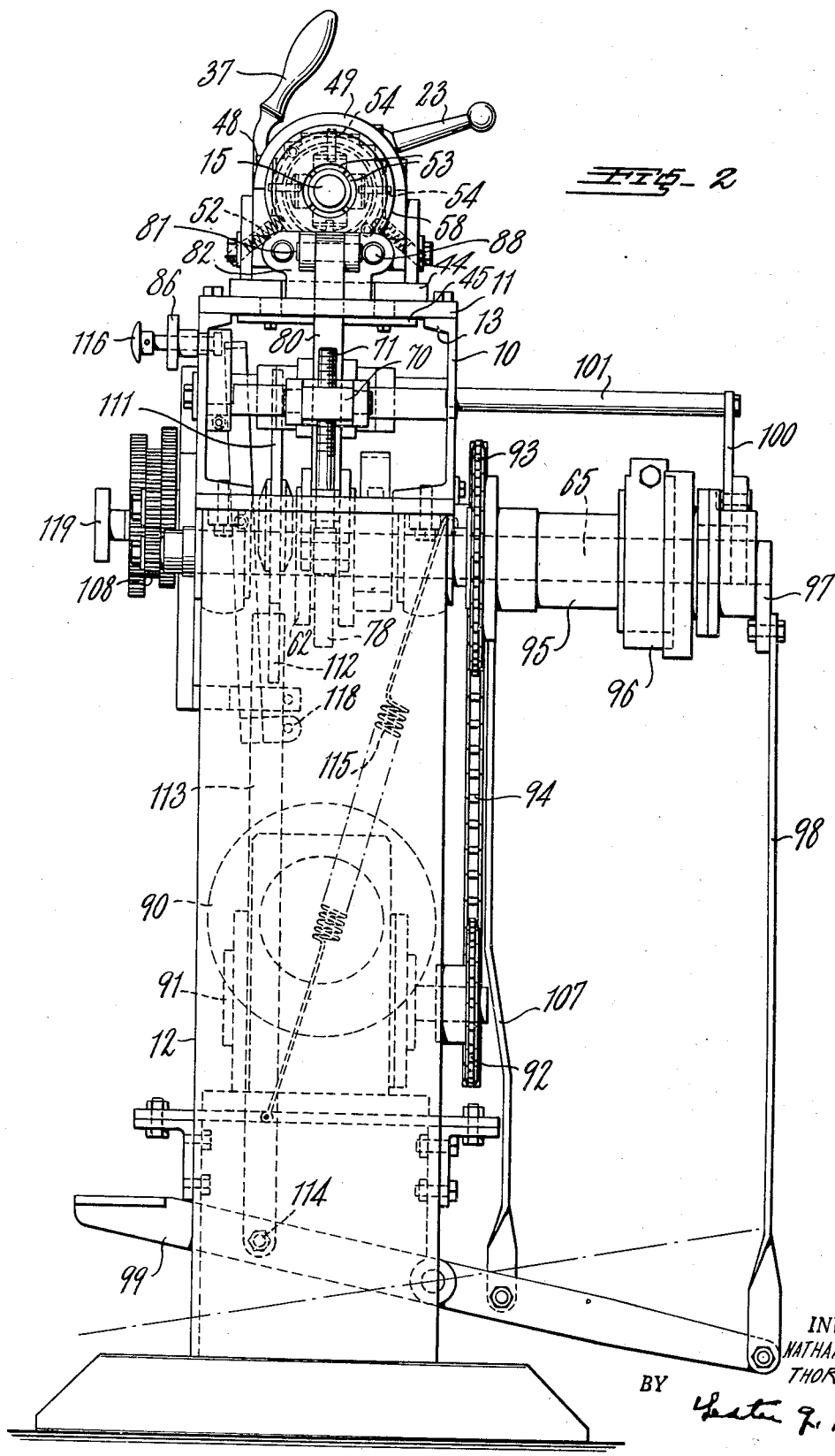
Fig. 2 is an end elevation of the machine of Fig. 1.

The present machine may also be provided with counting mechanism whereby it will be automatically stopped after a predetermined number of corrugations have been formed in the tube T. To this end there is provided upon the power shaft 65 the driving gear 108 which through the train of gears shown in Figs. 1 and 2 drives the gear 109 that is rigidly secured to a shaft 110 journaled in a bracket secured to the front side rail 10. To the rear end of this shaft 110 is secured the large disc 111 having cut in its periphery one or more deep notches 112 adapted to receive the upper end of the rod 113. The lower end of this rod is pivotally secured to the rocking foot treadle at 114. The arrangement is such that the upper end of the rod 113 normally rests upon the curved outer edge of the disc 111 to hold the treadle 99 depressed during the operation of the machine, but when this disc is rotated to such a position that the upper end of the rod 113 may enter the notch 112 the foot treadle will be permitted to rise to the full line position in which it is shown in Fig. 2, under the upward pull of the spring 115, to thereby stop the machine.

Should it be desirable to manually stop the machine without waiting until the disc 111 has rotated to the position just mentioned, this is accomplished by forcing inwardly the push button 116 slidably mounted transversely within the front side rail 10, to thereby rock the frame 117 which is pivoted intermediate its ends adjacent the shaft 110 and the lower end of this frame is connected to the rod 113 as shown at 118. The arrangement is such that when the stopping button 116 is pushed inwardly it will move the upper end of the rod 113 laterally out of the plane of the disc 111 to thereby permit the foot treadle to rise to the non-running position in which it is shown in Fig. 2. Should it be desired to rotate the disc 111 relative to its operating shaft 110 to change the setting of the disc, this may be done by operating the knob 119.

When a tube of unvulcanized rubber such as the tube T is to be corrugated upon the machine of the present invention the mandrel 15 is inserted therethrough. This mandrel with the tube thereupon is then passed through the central opening in the tube gripper G and through the corrugation holder H and is then inserted in the supporting sleeve 16 of the sliding carriage C. The mandrel is gripped in this sleeve 16 by rotating the lever 23 to the work clamping position. Before starting the machine the sliding carriage C should be moved in a right-hand direction to the end of its path of travel so that it will occupy the position in which it is shown in Fig. 1. This may be done by operating the lever 37 so as to relieve the gripping engagement of the leather pads 28 with the bar 25.

The present machine may then be started by operating the starting switch for the motor 90 and by depressing the foot treadle 99. This will reciprocate the tube gripper G and the corrugation holder H back and forth along a short path of travel so that each one moves together on their stroke towards the carriage C, and independently of each other away from the carriage but in definite timed relation to the other. The operation is such that the tube gripper G will move freely along the tube T away from the sliding carriage C but will grip the tube as soon as it has completed its movement away from the carriage C and as the tube gripper G starts to move in the opposite direction its jaws 53 will hold the tube T and compress it longitudinally to form the first corrugation c, one face of which will abut against the end of the sleeve 16. While this corrugation is being formed the corrugation holder H will be advanced with the tube gripper G, as will be apparent from Fig. 4 of the drawings to cooperate with the latter in forming the corrugation. After a corrugation is formed the tube gripper H will be held in abutting engagement with the corrugation as shown in Fig. 3, by the configuration of the cam 78, and the holder will remain in this position until the tube gripper H has completed its movement in a right hand direction viewing Fig. 3 and has gripped the tube, whereupon the corrugation holder H will be snapped in a right hand direction to the position in which it is shown in Fig. 5, under the action of the compressed springs 87.

The operation just described is such that the longitudinally compressed tube T is at all times under the control of the tube gripper G or corrugation holder H to prevent the tube from extending longitudinally after a corrugation has been formed.

The machine continues to operate in the manner just described to form one corrugation after another and as these corrugations are formed the sliding carriage C will be gradually pushed rearwardly against the opposition of the friction shoes 28. The formation of one corrugation after another may continue until the machine is stopped by the operator or by the stopping disc 111.

After the tube T has been provided with the desired number of corrugations, the end of this tube 120 which was not inserted in the sleeve 16 may be cut at the desired distance from the last formed corrugation c to provide a projecting sleeve at each end of the corrugated tube, to facilitate the securing of the tube to a gas mask and to a gas purifying receptacle. The corrugated tube may then be placed upon an auxiliary mandrel 121 having the adjustable collars 122 secured to the mandrel by set screws 123 or the like so as to hold the tube from expanding longitudinally as shown in Fig. 12, whereupon the corrugated tube is ready to be vulcanized.

Having thus described our invention, what we claim and desire to protect by Letters Patent is:

1. A tube corrugating machine for forming annular corrugations successively along a tube, comprising in combination, a tube supporting mandrel, a support for the mandrel, a corrugation holder movable along the mandrel, a tube gripper movable along the mandrel, means for moving the gripper and holder axially of the mandrel in one direction to form a corrugation about the tube, means for moving said gripper in the opposite direction, mechanism operated in synchronized relation with the said last mentioned means for holding said holder into abutting engagement with the last formed corrugation while said gripping means is moved in said opposite direction, and means for moving said holding means in said opposite direction.

2. A tube corrugating machine for forming annular corrugations successively along a tube, comprising in combination, a tube supporting mandrel, a support for the mandrel, a corrugation holder movable along the mandrel, a tube gripper movable along the mandrel, means for moving the gripper and holder axially of the mandrel in one direction to form a corrugation about the tube, and then retract the gripper relative to the tube, mechanism operated in synchronized relation with said gripper moving means for holding said holder into abutting engagement with the last formed corrugation while said gripper is retracted and then retracting said holder.

3. A tube corrugating machine for forming annular corrugations successively along a tube, comprising in combination, a tube supporting mandrel, a support for the mandrel, a corrugation holder movable along the mandrel, a tube gripper movable along the mandrel and constructed so that it will grip the tube automatically when moved in one direction and will slide relative to the tube when moved in the opposite direction, means for advancing the gripper and holder to form a corrugation about the tube, mechanism operated in synchronized relation with the gripper advancing means to hold the holder into abutting engagement with the last formed corrugation while said gripper is moved in said opposite direction, and means for releasing said holder and returning it to a position to be again advanced with said gripper.

4. A tube corrugating machine for forming annular corrugations successively along a tube, comprising in combination, a tube supporting mandrel, a support for the mandrel, a corrugation holder movable along the mandrel, a tube gripper movable along the mandrel, means for moving the gripper axially of the mandrel in a direction to form a corrugation about the tube, mechanism operated in synchronized relation with said means for moving said holder into and out of abutting engagement with the last formed corrugation, and a counter operable automatically to stop the machine upon the formation of a determined number of corrugations.

5. A tube corrugating machine for forming annular corrugations successively along a tube, comprising in combination, a tube supporting mandrel, a support for the mandrel, a corrugation holder movable along the mandrel, a tube gripper movable along the mandrel, means for moving the gripper axially of the mandrel in a direction to form a corrugation about the tube, mechanism operated in synchronized relation with said means for moving said holder into abutting engagement with the last formed corrugation, and means whereby said support recedes from said holder as the corrugations increase in number.

6. A tube corrugating machine for forming annular corrugations successively along a tube, comprising in combination, a tube supporting mandrel, a support for the mandrel, a corrugation holder movable along the mandrel, a tube gripper movable along the mandrel, means for moving the gripper axially of the mandrel in a direction to form a corrugation about the tube, mechanism operated in synchronized relation with said means for moving said holder into abutting engagement with the last formed corrugation, and a carriage for said support mounted to yield under a determined pressure to thereby control the maximum pressure exerted upon the tube corrugations by the holder and gripper.

7. A tube corrugating machine for forming annular corrugations successively along a tube, comprising in combination, a tube supporting mandrel, a support for the mandrel, a corrugation holder movable along the mandrel, a tube gripper movable along the mandrel, means for moving the gripper axially of the mandrel in a direction to form a corrugation about the tube and then retract the gripper, and mechanism operated in synchronized relation with said gripper moving means for moving said holder into abutting engagement with the last formed corrugation and retaining it in this position until the gripper is fully retracted and then retracting the holder.

8. A tube corrugating machine for forming annular corrugations successively along a tube, comprising in combination, a tube supporting mandrel, a main frame, a support for the mandrel upon said frame, a corrugation holder slidably mounted upon said frame, a tube gripper slidably mounted upon said frame, means for moving the gripper and holder along the mandrel in one direction to form a corrugation about the tube, means for moving said gripper in the opposite direction, mechanism operated in synchronized relation with said last mentioned means for holding said holder into abutting engagement with the last formed corrugation while said gripping means is moved in said opposite direction, and means for moving said holding means in said opposite direction.

9. A tube corrugating machine for forming annular corrugations successively along a tube, comprising in combination, a tube supporting mandrel, a main frame, a support for the mandrel upon said frame, a corrugation holder slidably mounted upon said frame, a tube gripper slidably mounted upon said frame, means for moving the gripper along the mandrel in a direction to form a corrugation about the tube, a sliding carriage for said support adapted to recede as the pressure upon the corrugations reaches a predetermined maximum, and mechanism operated in synchronized relation with said means for moving said holder into abutting engagement with the last formed corrugation.

10. A tube corrugating machine for forming annular corrugations successively along a tube, comprising in combination, a tube supporting mandrel, a main frame, a support for the mandrel upon said frame, a corrugation holder slidably mounted upon said frame, a tube gripper slidably mounted upon said frame, means for moving the gripper along the mandrel in a direction to form a corrugation about the tube, a runway upon which said support is slidably mounted so that the support can recede as the pressure upon the corrugations increases, adjustable friction means between said support and runway, and mechanism for moving said holder against the last formed corrugation.

11. A tube corrugating machine for forming annular corrugations successively along a tube, comprising in combination, a tube supporting mandrel, a main frame, a yieldable support for the mandrel slidably mounted upon said frame, means for controlling the resistance of said support to sliding movement, a corrugation holder supported by said frame, a tube gripper supported by said frame, and means for operating said holder and gripper whereby the latter forms a corrugation and the former holds the corrugation from spreading along the mandrel.

12. A tube corrugating machine for forming annular corrugations successively along a tube, comprising in combination, a tube supporting mandrel, a main frame, a support for the mandrel slidably mounted upon said frame, friction means for controlling the sliding movement of said support, a corrugation holder supported by said frame, a tube gripper supported by said frame and constructed to grip automatically the tube to force it in one direction only, and means for operating said holder and gripper whereby the latter forms a corrugation and the former holds the corrugation from spreading along the mandrel.

13. A tube corrugating machine for forming annular corrugations successively along a tube, comprising in combination, a tube supporting mandrel, a support for the mandrel, a tube gripper movable along the mandrel, means for reciprocating this tube gripper for a short distance along the mandrel to grip the tube and form one corrugation after another, and a sliding mounting for said support adapted to recede from the tube gripper under a predetermined pressure as the corrugations increase upon said mandrel.

14. A tube corrugating machine for forming annular corrugations successively along a tube, comprising in combination, a tube supporting mandrel, a support for the mandrel, a tube gripper movable along the mandrel, means for reciprocating this tube gripper for a short distance along the mandrel to grip the tube and form one corrugation after another, a sliding mounting for said support adapted to recede from the tube gripper as the corrugations increase upon said mandrel, and means cooperating with the sliding mounting to resist its sliding movement with an adjustable force.

15. A tube corrugating machine for forming corrugations successively along a tube, said machine comprising in combination, a mandrel for supporting said tube by contact with the inside thereof, a corrugation holder and a tube gripper slidably supported on said frame and adapted to surround and move along said mandrel, means for advancing said holder and said gripper simultaneously towards said support, means for retracting said gripper, means for holding said holder against the last formed corrugation until said gripper has been retracted, means for releasing said holder and retracting same, means for yieldably resisting the slidable movement of said mandrel support but permitting slidable movement in response to pressure exerted between said holder and the last formed corrugation.

NATHANIEL H. CURTISS.
THOR J. AAMLAND.